United States Patent
Nomura (10) Patent No.: US 8,310,182 B2
(45) Date of Patent: Nov. 13, 2012

(54) LINEAR SYNCHRONOUS MOTOR CONTROL METHOD AND CONTROL APPARATUS

(75) Inventor: Yuki Nomura, Shinagawa-ku (JP)

(73) Assignee: THK Co., Ltd., Tokyo (JP)

( * ) Notice: Subject to any disclaimer, the term of this patent is extended or adjusted under 35 U.S.C. 154(b) by 113 days.

(21) Appl. No.: 13/060,952

(22) PCT Filed: Aug. 21, 2009

(86) PCT No.: PCT/JP2009/064617
§ 371 (c)(1),
(2), (4) Date: Feb. 25, 2011

(87) PCT Pub. No.: WO2010/024190
PCT Pub. Date: Mar. 4, 2010

(65) Prior Publication Data
US 2011/0156619 A1    Jun. 30, 2011

(30) Foreign Application Priority Data

Aug. 28, 2008 (JP) ................................. 2008-220022

(51) Int. Cl.
*H02P 6/16* (2006.01)

(52) U.S. Cl. ................................ 318/400.02; 318/400.32

(58) Field of Classification Search .................. 318/135, 318/702, 400.02, 400.32, 400.35
See application file for complete search history.

(56) References Cited

U.S. PATENT DOCUMENTS

| 7,375,482 B2 * | 5/2008 | Kubo et al. ................. 318/254.1 |
| 7,388,340 B2 * | 6/2008 | Nojima ..................... 318/400.02 |
| 2008/0129243 A1 * | 6/2008 | Nashiki .......................... 318/701 |

FOREIGN PATENT DOCUMENTS

| JP | 62-290385 A | 12/1987 |
| JP | 2002-223587 A | 8/2002 |
| JP | 2004-023936 A | 1/2004 |
| JP | 2004-329604 A | 11/2004 |

* cited by examiner

*Primary Examiner* — Walter Benson
*Assistant Examiner* — Iftekhar Mustafa
(74) *Attorney, Agent, or Firm* — Sughrue Mion, PLLC

(57) ABSTRACT

It makes possible to control a movable element to be smoothly movable by a sensor-less vector control in an equal speed area, without using a position sensor, and possible to perform a stop control and control it in a low speed area. In a case when a moving speed of the armature is faster than a predetermined speed preliminarily determined within a range in which the movable element is moved in synchronous with movement of the magnetic field generated by the armature by a predetermined sensor-less vector control, the current passing through the armature is controlled by the sensor-less vector control, and in a case when the moving speed of the armature is slower than the predetermined speed, in a d-q coordinate in which a d-axis represents a direction of a flux generated by field and a q-axis represents a phase advanced by $\pi/2$ with respect to the d-axis, a d-axis armature current and a q-axis armature current are controlled so that a d-axis electric angle is produced, and current passes through the d-axis armature and does not pass through the q-axis armature.

4 Claims, 8 Drawing Sheets

LINEAR SYNCHRONOUS MOTOR CONTROL METHOD AND CONTROL APPARATUS

CROSS REFERENCE TO RELATED APPLICATION

This application is a National Stage of International Application No. PCT/JP2009/064617filed on Aug. 21, 2009, which claims priority from Japanese Patent Application No. 2008-220022, filed on Aug. 28, 2008, the contents of all of which are incorporated herein by reference in their entirety.

FIELD OF THE INVENTION

The present invention relates to a technical field concerning linear synchronous motor control method and control apparatus utilized for a permanent magnet as field.

BACKGROUND TECHNOLOGY

Conventionally, in a linear synchronous motor in which a movable element is linearly moved by a field generated by a permanent magnet and a moving magnetic field generated by an armature, the position and the moving speed of the movable element is controlled by using a position sensor, a speed sensor, magnetic polar sensor and the like.

On the other hand, as a control method in which a linear synchronous motor is driven without using a sensor, a sensor-less vector control technology is generally utilized (for example, refer to Patent Publication 1). In the sensor-less vector control technology, there is generally adopted a method of estimating a position and a moving speed of a movable element by using induced electromotive force induced to an armature by rotation of a linear synchronous motor.

PRIOR ART LITERATURE

Patent Publication

Patent Publication 1: Japanese Patent Laid-open Publication No. 2002-223587

DISCLOSURE OF THE INVENTION

Problems to be Solved by the Invention

However, it is difficult to exactly estimate the position and the moving speed of the movable element at a time of low-speed moving or reduced speed moving for stopping operation at which the induced electromotive force is made small, thus being difficult to control the position and the moving speed of the movable element. Therefore, the sensor-less vector control technology has not been utilized for the purpose of positioning the movable element.

The present invention has been made in consideration of the above circumstances and an object thereof is to provide control method and control apparatus of a linear synchronous motor capable of smoothly moving the movable element under the sensor-less vector control in a constant speed region and enabling the controlling in a stopping control and low-speed area without using any position sensor.

Means for Solving the Problem

In order to achieve the above object, the present invention of claim 1 provides a linear synchronous motor control method, in which current passing through an armature of a linear synchronous motor having a movable element moved by magnetic field generated by the armature, wherein in a case when a moving speed of the armature is faster than a predetermined speed preliminarily determined within a range in which the movable element is moved in synchronous with movement of the magnetic field generated by the armature by a predetermined sensor-less vector control, the current passing through the armature is controlled by the sensor-less vector control, and in a case when the moving speed of the armature is slower than the predetermined speed, in a d-q coordinate in which a d-axis represents a direction of a flux generated by field and a q-axis represents a phase advanced by $\pi/2$ with respect to the d-axis, a d-axis armature current and a q-axis armature current are controlled so that a d-axis electric angle is produced, and current passes through the d-axis armature and does not pass through the q-axis armature.

The invention recited in claim 2 is, in the linear synchronous motor control method, in a case when the movable element is stopped during movement of the movable element in an area in which a position of the movable element is detected by a position sensor by reading a linear scale, the current passing through the armature is controlled based on the position of the movable element detected by the position sensor.

The invention recited in claim 3 is a control apparatus for controlling current passing through an armature of a linear synchronous motor in which the movable element is moved by movement of magnetic field generated by the armature, the control apparatus comprising: a sensor-less vector control unit that controls current passing through the armature by a predetermined sensor-less vector control; an open-loop control unit that controls current passing through the armature by an open-loop control; and a selecting unit that selects the control unit for controlling the current passing through the armature, wherein the open-loop control unit comprises: a phase producing unit that produces a d-axis electric angle corresponding to a position command in a d-q coordinate in which a d-axis represents a direction of a flux produced by field and a q-axis represents a phase advanced by $\pi/2$ with respect to the d-axis; a phase producing unit that produces a d-axis electric angle corresponding to the position command; a current detecting unit that detects a three-phase current passing through the armature; a three-phase alternating current converting unit that performs a coordinate conversion in which a three-phase alternating current detected by the current detecting unit is converted to a d-axis armature current and a q-axis armature current based on the electric angle produced by the phase producing unit; and a current control unit that controls the d-axis armature current and the q-axis armature current so that the current passes through the d-axis armature and does not pass through the q-axis armature, and wherein the selecting unit selects a control unit such that in a case when the moving speed of the movable element is faster than a predetermined speed preliminarily determined within a range in which the movable element is moved in synchronous with movement of the magnetic field generated by the armature by a predetermined sensor-less vector control, the sensor-less vector control is selected, and on the other hand, in a case when the moving speed of the armature is slower than the predetermined speed, the open-loop control is selected.

The invention recited in claim 4, in the control apparatus of claim 3 further comprises a feedback control unit that controls the current passing through the armature by using a feedback control based on a position detected by the position sensor detecting the position of the movable element by reading the linear scale, wherein the selecting unit selects the feedback control in a case when the movable element is stopped during the movement in an area in which the position of the movable element is detected by the position sensor within a movable range of the movable element.

Effects of the Invention

According to the present invention, since the control of the movement of the movable element can be executed by the sensor-less vector control in the case when the moving speed of the movable element is faster than the predetermined moving speed, in such case, it becomes possible to smoothly move the movable element by the sensor-less vector control, and on the contrary, in the case when the moving speed of the movable element is slower than the predetermined moving speed, an electric angle corresponding to the position command is produced, and the control in which the current passes through the d-axis armature and does not pass through the q-axis armature, and according to such control, the stop control and the control in the low speed area of the movable element can be performed.

MODE FOR EMBODYING THE INVENTION

Hereunder, preferred embodiments for embodying the present invention will be explained with reference to the accompanying drawings. It is further to be noted that the following embodiments do not limit the invention recited in each claim, and all the combination of subject features disclosed in the respective embodiments is not essential for the solution of the invention.

[1. First Embodiment]

Hereinafter, an embodiment in which the present invention is applied to a flat-type linear synchronous motor as a linear synchronous motor will be explained.

[1.1 Structure of Linear Motor System]

Structure of a linear motor system 1 according to a first embodiment will be explained with reference to FIG. 1. Herein, FIG. 1 is a view showing a schematic structure of the linear motor system 1 according to the first embodiment.

Figure 1:
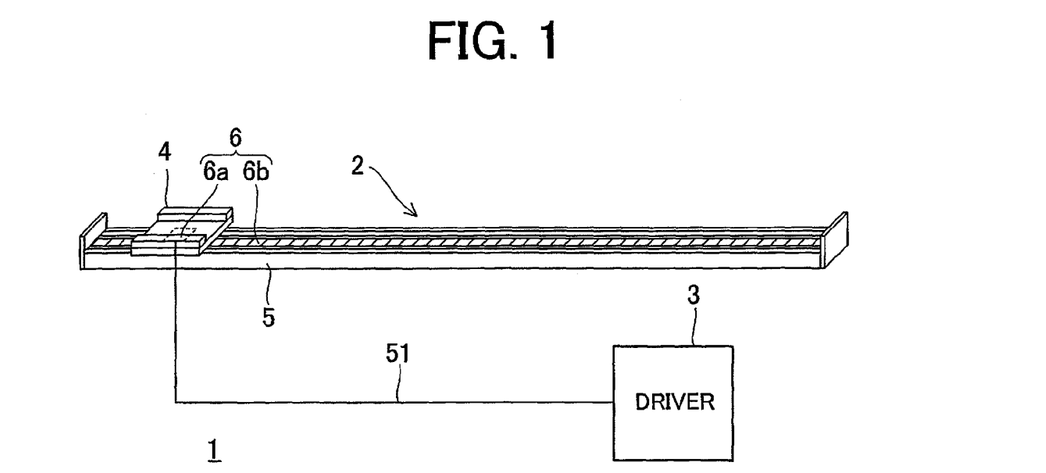
FIG. 1 is a view showing a schematic structure of a linear motor system 1 according to a first embodiment.

As shown in FIG. 1, the linear motor system 1 includes an actuator 2 and a driver 3 as a controller, and the actuator 2 is provided with a slider 4 (as a movable element of member) and a base 5 supporting the slider 4 to be slidable.

A linear synchronous motor 6 is adopted as driving means for the slider 4. The linear synchronous motor 6 is composed of an armature 6a as a movable element mounted to a lower portion of the slider 4 and a magnet plate 6b as a stator (fixing element) mounted to a bottom surface of the base 5.

The armature 6a is composed of a core formed of a magnetic material and three-phase coils wound around projected poles of the core, and three-phase alternating current is supplied to the three-phase coils, respectively. The magnet plate 6b is composed of a plurality of permanent magnets which are arranged on the surface of the base 5 side by side in the longitudinal direction thereof so that the N- and S-poles of the permanent magnets appear alternately. Then, when three-phase current flows in the three-phase coil, a movable field, which moves in a lateral direction on the drawing, is generated.

The armature 6a and the slider 4 are linearly moved by thrust force obtained by the movable field in synchronous with the moving speed of the movable field.

Three-phase current passing through the three-phase coil of the armature 6a is controlled by a driver 3, and the three-phase current output from the driver 3 is supplied to the armature 6a through a power cable 51. A directly moving device is not mounted with a linear scale and a position sensor, and accordingly, the driver 3 does not perform feedback control, and alternately, the driver 3 performs a sensor-less vector control and an open-loop control in which electric current flows in a d-axis armature and does not flow in a q-axis armature while selectively switching these controls in accordance with the moving speed of the slider (armature 6a).

[1.2 Principle of Open-loop Control According to Embodiment]

Hereinafter, the principle of the open-loop control performed by the driver 4 of the present embodiment will be explained with reference to FIG. 2. Further, FIG. 2 is a schematic view showing a synchronous motor for explaining the open-loop control according to the first embodiment, and FIG. 3 is a block diagram showing one example of a control device for explaining the open-loop control according to the first embodiment.

In the linear synchronous motor in which the magnetic field linearly moves, the d- and q-axis armature currents can be controlled by using d-q coordinate system of rotational coordinate. The d-q conversion means that a fixed portion and a movable portion of the synchronous motor are both converted to a rotating Cartesian coordinate, and the coordinate system thereof is the d-q coordinate system. The q-axis resides in a phase advancing by $\pi/2$ with respect to the d-axis. The d-axis is generally oriented in a direction of flux forming the magnetic field.

Figure 2:
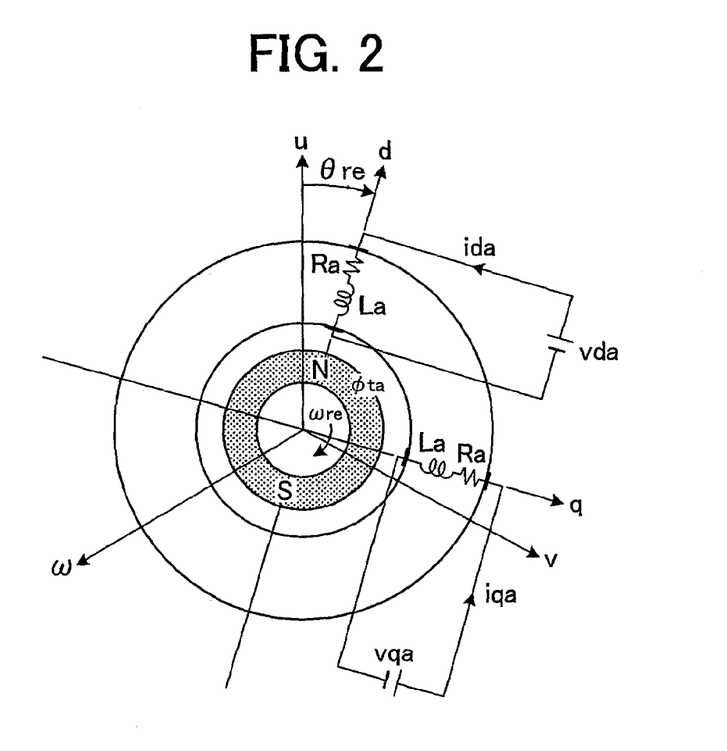
FIG. 2 is a schematic view showing a synchronous motor for explaining an open-loop control according to the first embodiment.
Figure 3:
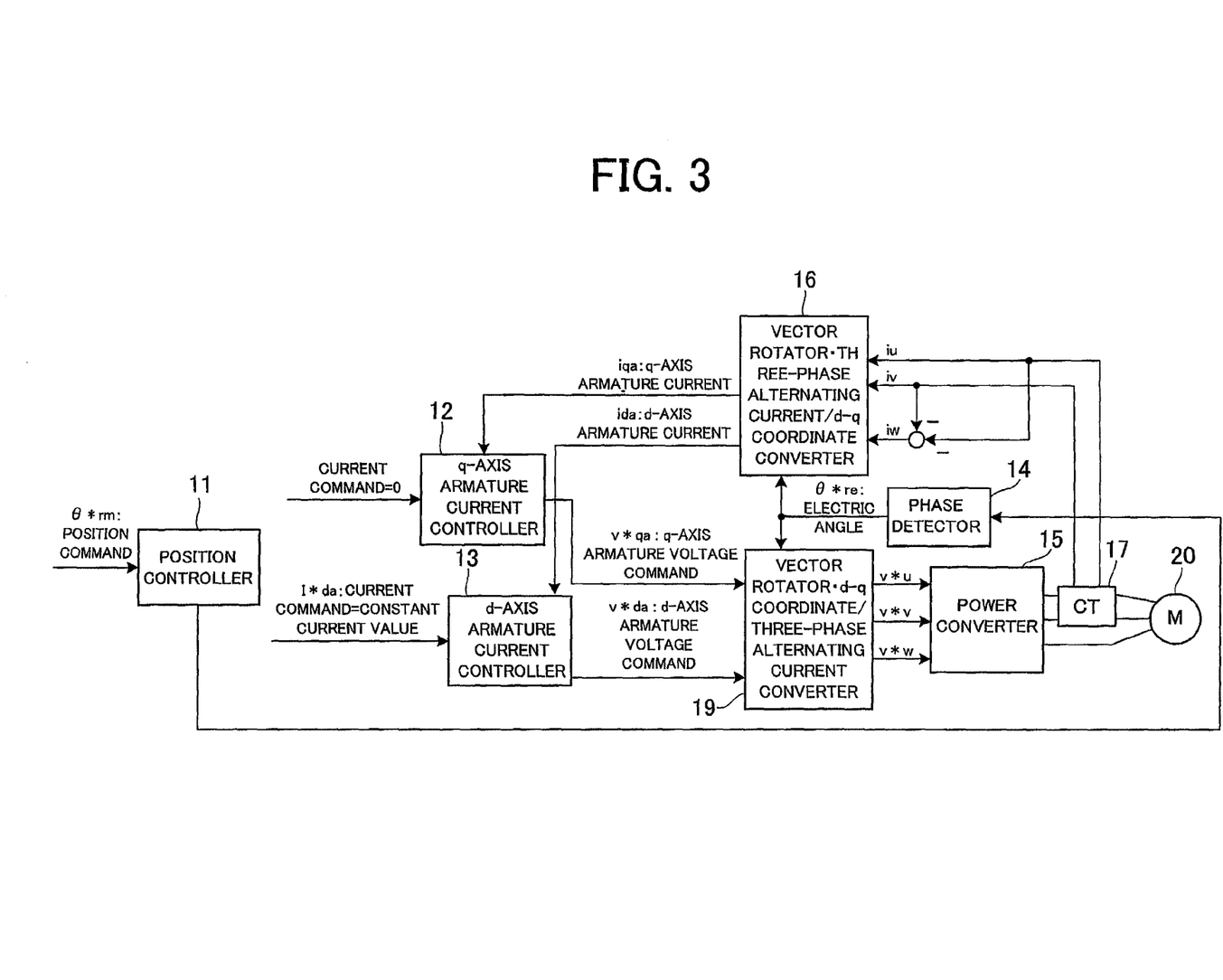
FIG. 3 is a block diagram showing one example of a control apparatus for explaining the open-loop control according to the first embodiment.

In FIG. 2, vda and vqa denote d- and q-axis armature voltages, respectively, ida and iqa denote d- and q-axis armature currents, respectively, $\phi$fa indicates number of an armature winding interlinkage magnetic flux, Ra indicates an armature winding resistance, and La is a self-impedance. When relational equation (expression) between the voltage, the current and the impedance, i.e., circuit equation, is obtained from an equation circuit, the relational equation will be expressed as follows.

$$\begin{bmatrix} v_{da} \\ v_{qa} \end{bmatrix} = \begin{bmatrix} R_a + PL_a & -\omega_{re}L_a \\ \omega_{re}L_a & R_a + PL_a \end{bmatrix} \begin{bmatrix} i_{da} \\ i_{qa} \end{bmatrix} + \begin{bmatrix} 0 \\ \omega_{re}\varphi_{qa} \end{bmatrix} \quad \text{[Equation 1]}$$

Right-hand side second term of this equation represents a speed electromotive force induced by the d- and q-axis armature windings by the magnetic field of the permanent magnets, and eda=0 (zero) and eqa=ωreϕfa. FIG. 2 shows a condition, in which the armature windings connected to a rectifier such as direct current (DC) motor exist innumerably in the radial direction, vda and vqa are applied to the armature windings through brushes disposed on the d- and q-axis rotating at the same speed as the magnetic field, and thereby, ida and iqa flow. In a case where the vda and vqa are of the DC voltage, the ida and iqa become also DC voltage, which are handled as biaxial direct current.

When the Equation 1 is deformed to a state equation (differential equation), the following equation will be obtained.

$$p\begin{bmatrix} i_{da} \\ i_{qa} \end{bmatrix} = \begin{bmatrix} -\frac{R_a}{L_a} & \omega_{re} \\ -\omega_{re} & -\frac{R_a}{L_a} \end{bmatrix} \begin{bmatrix} i_{da} \\ i_{qa} \end{bmatrix} + \frac{1}{L_a}\begin{bmatrix} V_{da} \\ V_{qa} \end{bmatrix} + \frac{1}{L_a}\begin{bmatrix} 0 \\ e_{qa} \end{bmatrix} \quad \text{[Equation 2]}$$

This equation 2 indicates that the vda and vqa as the d- and q-axis armature voltages can control the ida and iqa as the d- and q-axis armature currents.

FIG. 3 is a block diagram showing one example of a controlling apparatus for explaining the open-loop control according to the first embodiment. This controlling apparatus drives a synchronous motor in an open-loop state by always passing a constant current in the d-axis direction (direction of the permanent magnetic flux) of the synchronous motor without using any position detector at the time of driving the synchronous motor.

The controlling apparatus is equipped with a position controller 11 for receiving a position command, a q-axis armature current controller 12 for controlling the q-axis armature current, a d-axis armature current controller 13 for controlling the d-axis armature current, a phase detector 14 for producing an electric angle in response to the position command, an electric power converter 15 such as voltage-type PWM inverter (Pulse Width Modulation Inverter) for supplying electric power to the synchronous motor, a vector rotator·three-phase alternating current/d-q coordinate converter 16 as three-phase alternating current/d-q coordinate converting means, a current detector 17 for detecting feedback current from the synchronous motor 20, and a vector rotator·d-q coordinate/three-phase alternating current converter 19.

Position command θ*rm is given to the position controller 11 from a superior controlling device such as computer. The position controller 11 outputs the position command θ*rm to the position detector 14. The position detector 14 calculates an electric angle θ*re corresponding to the position command and then outputs the electric angle θ*re to the vector rotator·three-phase alternating current/d-q coordinate converter 16 as three-phase alternating current/d-q coordinate converting means. The vector rotator·three-phase alternating current/d-q coordinate converter 16 serves to convert the three-phase feedback current values iu, iv and iw from the current detector 17 to the q-axis armature current iqa, and the d-axis armature current ida, respectively.

The q-axis armature current controller 12 calculates deviation between the q-axis armature current command and the q-axis armature current iqa and operates the command value v*qa of the q-axis armature voltage. Herein, the q-axis armature current command is set to "0" (zero). The q-axis armature current controller 12 controls the q-axis armature current iqa so that this current iqa becomes "0". In a conventional servo-motor, although the q-axis armature current iqa has been made variable in accordance with torque to be required, in the open-loop control technology according to the present embodiment, the characteristic feature resides in the fact that the q-axis armature current command is set to be always "0".

The d-axis armature current controller 13 calculates deviation between the d-axis armature current command and the d-axis armature current ida and operates the command value v*da of the d-axis armature voltage. Herein, the d-axis armature current command is set to a constant current value, for example, rated current of a synchronous motor. The rated current means a current value at which the synchronous motor is not burnt out even if the current is continuously flowed therein for a long time. In a conventional servo-motor, although the d-axis armature current ida has been usually set to be "0", in the present embodiment, the characteristic feature resides in the fact that the d-axis armature current command is set to be a constant current value.

The vector rotator·d-q coordinate/three-phase alternating current converter 19 outputs three-phase v*u, v*v and v*w based on the voltage commands v*da, v*qa and an electric angle θ*re, respectively. The power converter 15 performs the PWM control to the output voltage in response to the voltage commands and then controls the current flowing the synchronous motor 20.

Figure 4A:
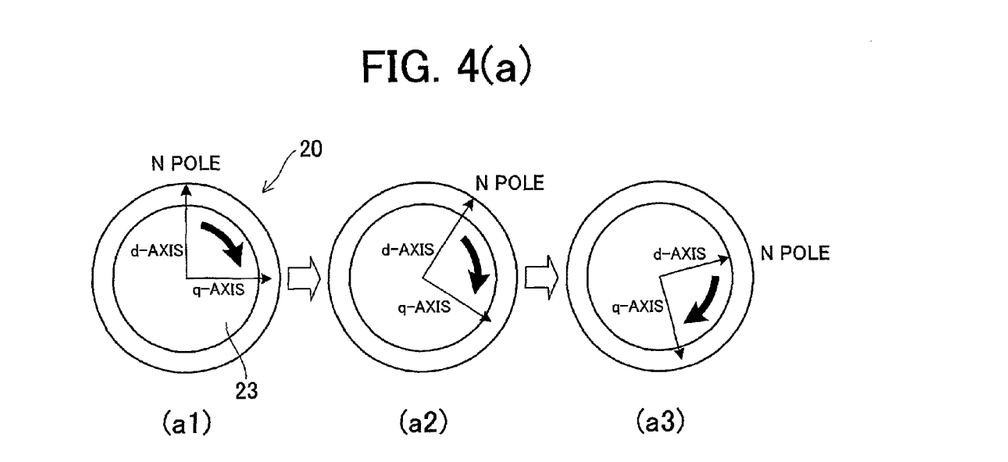
FIG. 4(a) and FIG. 4(b) represent operations of the synchronous motor shown on d-q coordinate and includes (a) being a view showing an operation of a conventional feedback control using a position detector, and (b) being a view showing an operation of an open-loop control according to the present embodiment using no position detector.
Figure 4B:
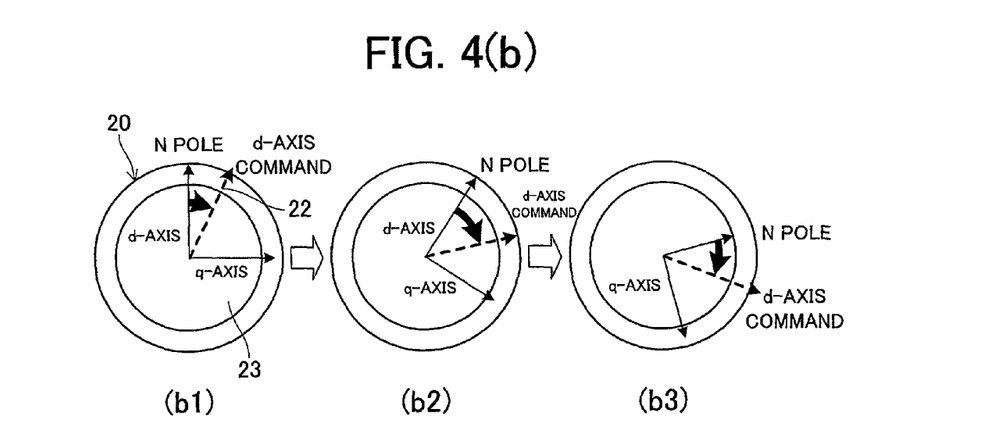

FIG. 4 represents the operations of the synchronous motor shown with the d-q coordinate. FIG. 4(a) shows an operation view of a conventional feedback control mode using a position detector, and on the other hand, FIG. 4(b) shows an operation view of the open-loop control mode according the present embodiment which does not use any position detector.

In the conventional feedback control, the control is performed by making the d-axis armature current to zero "0" and the q-axis armature current to a value consistent with a required torque. By passing the current through the q-axis armature, torque is generated and the permanent magnet 23 of the synchronous motor 20 is rotated in a manner of (a1)→(a2)→(a3). The position of the d-axis (pole position) is calculated by position information detected by the position detector.

In contrast with the above method, in the open-loop control mode according to the present embodiment, the pole position command (d-axis command) 22 of the permanent magnet 23 driven by the position command is calculated. Then, the d-axis armature current and q-axis armature current are controlled such that a constant current flows in the d-axis armature and any current does not flow in the q-axis armature. According to such operation, the pole position (d-axis position) of the permanent magnet 23 is attracted by the pole position command 22 and stops to the position of the pole position command 22. When the pole position command 22 is changed in a manner of (b1)→(b2)→(b3) shown in FIG. 4(b) in this order, the permanent magnet 23 is rotated, and at the rotation stop time, retaining force at a time when the rated current flows in the synchronous motor 20 is generated.

In the open-loop control according to the present embodiment, since the current does not flow in the q-axis armature, torque generated to the synchronous motor is small. Because of this reason, in a case when a load is applied to the synchronous motor 20, there is a fear such that the synchronous motor 20 does not follow the change of the electric angle. However, the torque of the synchronous motor 20 can be increased by passing the rated current in the synchronous motor 20. As the electric angle gradually increases such as +5 degrees, +10 degrees, +15 degrees, - - -, a large torque gradually acts on the synchronous motor 20, so that the synchronous motor 20 can be operated by increasing the electric angle (the largest torque acts at the electric angle of +90 degrees). At a time when the synchronous motor 20 is once operated, since the synchronous motor 20 can be operated continuously by inertia, the synchronous motor 20 finally approaches the electric angle.

[1.3 Structure of Driver]

Next, the structure of the driver 3 according to the present embodiment will be explained with reference to FIG. 5. Herein, FIG. 5 is a block diagram showing one example of a schematic structure of the driver according to the first embodiment.

Figure 5:
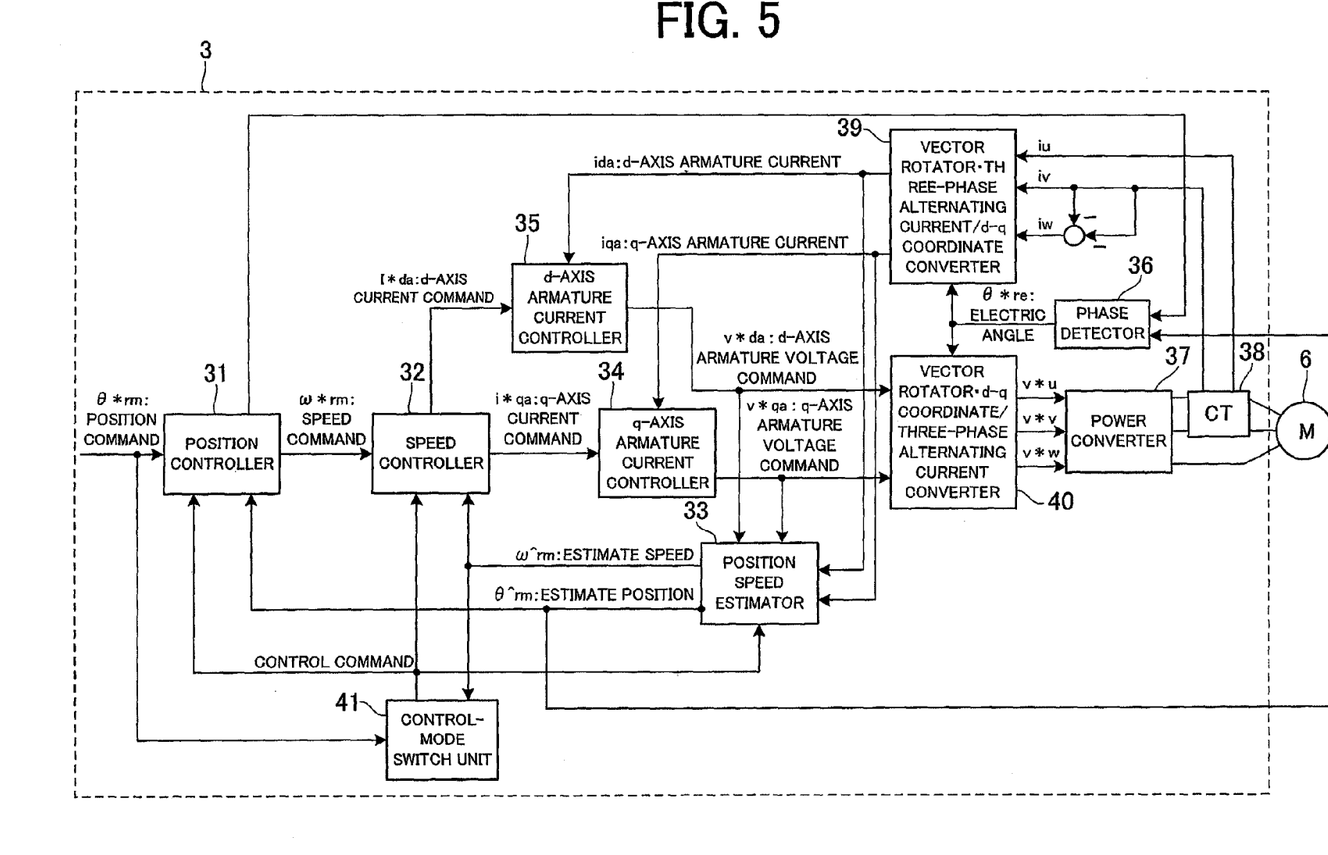
FIG. 5 is a block diagram showing one example of a schematic structure of a driver 3 according to the first embodiment.

As shown in FIG. 5, the driver 3 includes: a position controller 31 receiving the position command; a speed controller 32 controlling the moving speed of the armature 6a of the linear synchronous motor 6; a position speed estimator 33 estimating the position and the moving speed of the armature 6a; a q-axis armature current controller 34 and a d-axis armature current controller 35 as current control means for controlling the q-axis- and d-axis armature currents; a phase detector 36 as phase generating means for generating the electric angle in response to the position command; a power converter 37 such as voltage-type PWN inverter for supplying electric power to the synchronous motor in response to the q- and d-axis armature voltage commands; a vector rotator·three-phase alternating current/d-q coordinate converter 39 as three-phase alternating current/d-q coordinate converting means; a current detector 38 as electric current detecting means for detecting feedback current from the synchronous motor 20; a vector rotator·d-q coordinate/three-phase alternating current converter 40; a control-mode switch unit 41 as selecting means for selectively switching the sensor-less vector control and the open-loop control.

Herein, in the above structure of the driver 3, the position controller 31, the speed controller 32, the position speed estimator 33, the q-axis armature current controller 34, the d-axis armature current controller 35, the phase detector 36, the power converter 37, the current detector 38, the vector rotator·three-phase alternating current/d-q coordinate converter 39, and the vector rotator·d-q coordinate/three-phase alternating current converter 40 constitute the sensor-less vector control means. Further, the position controller 31, the q-axis armature current controller 34, the d-axis armature current controller 35, the phase detector 36, the power converter 37, the current detector 38, the vector rotator·three-phase alternating current/d-q coordinate converter 39, and the vector rotator·d-q coordinate/three-phase alternating current converter 40 constitute the open-loop control means.

The position controller 31 performs two kinds of control modes in response to the control command from the control-mode switch unit 41. The control command includes sensor-less vector control command and an open-loop control command.

In the case when the control command is the sensor-less vector control command, the position controller 31 operates the speed command ω*rm based on the deviation between the position command θ*rm output from the superior controlling device such as computer and the estimate position θ^rm output from the position speed estimator 33, and the speed command ω*rm is then output to the speed controller 32. On the other hand, in the case when the control command is the open-loop control command, the position controller 31 outputs the position command θ*rm output from the superior controlling device to the position detector 14.

The speed controller 32 performs two kinds of control modes in response to the control command from the control-mode switch unit 41. In the case when the control command is the sensor-less vector control command, the position controller 31 operates the thrust command based on the deviation between the speed command ω*rm output from position controller 31 and the estimate speed ω^rm output from the position speed estimator 33, and further operates the q-axis current command i*qa. Furthermore, he speed controller 32 outputs the q-axis current command i*qa to the q-axis armature current controller 34, and also, sets the d-axis current command i*da to "0", which is then output to the d-axis armature current controller 35. On the other hand, in the case when the control command is the open-loop control command, the speed controller 32 sets the d-axis current command i*da to, for example, the rated current, which is then output to the d-axis armature current controller 35, and also, set the q-axis current command i*qa to "0", which is then output to the q-axis armature current controller 34.

The position speed estimator 33 is operated at a time when the sensor-less vector control command is output. More specifically, the position speed estimator 33 calculates the estimated portion θ^rm and the estimate speed ω^rm in response to the d-axis current command i*da and the q-axis current command i*qa output from the vector rotator·three-phase alternating current/d-q coordinate converter 39, the d-axis armature voltage command and the q-axis armature voltage command. Further, as to the estimated position estimating method and the estimated speed estimating method, a method utilized for general sensor-less vector control will be applicable. Further, the estimated position and the estimated speed may be operated by either one of the voltage command and the armature current. The position speed estimator 33 is operated so as to output the estimated portion θ^rm to the position controller 31 and the phase detector 36, and also output the estimate speed ω^rm to the speed controller and the control-mode switch unit 41.

The position command θ*rm or estimated position θ^rm is supplied to the phase detector 36 in response to the control command output to the position controller 31 and the position speed estimator 33 from the control-mode switch unit 41. In the case when the control command is the sensor-less vector control command, the estimated position θ^rm is supplied to the position detector 36 from the position speed estimator 33. On the other hand, in the case when the control command is the open-loop control command, the position command θ*rm is supplied to the phase detector 36. Then, the phase detector 36 calculates the electric angle θ*re corresponding to the position command θ*rm or estimated position θ^rm and outputs the electric angle θ*re to the vector rotator·three-phase alternating current/d-q coordinate converter 39, and the vector rotator·d-q coordinate three-phase alternating current converter 40.

The vector rotator·three-phase alternating current/d-q coordinate converter 39 acts to convert the three-phase feedback current values iu, iv and iw from the current detector 38 to the q-axis armature current iqa and d-axis armature current ida in accordance with the electric angle θ*re.

The q-axis armature current controller 34 calculates the deviation between the q-axis armature current command and the q-axis armature current iqa, operates the q-axis armature voltage command v*qa and then outputs the v*qa to the position speed estimator 33 and the vector rotator·d-q coordinate three-phase alternating current converter 40.

The d-axis armature current controller 35 calculates the deviation between the d-axis armature current command and the d-axis armature current ida, operates the d-axis armature voltage command v*da and then outputs the v*da to the position speed estimator 33 and the vector rotator·d-q coordinate three-phase alternating current converter 40.

The vector rotator·d-q coordinate three-phase alternating current converter 40 outputs the three-phase voltage command v*u, v*v and v*w in response to the voltage commands v*da and v*qa from the q-axis armature current controller 34 and the d-axis armature current controller 35 and the electric angle θ*re from phase detector 36. The power converter 15 performs the PWM control to the output voltage and controls the current passing to the armature 6a of the linear synchronous motor 6.

The control-mode switch unit 41 acts to determine which one of the sensor-less vector control and the open-loop control is to be executed in response to the moving speed of the armature 6a of the linear synchronous motor 6, and based on this result, the control commands are output to the position controller 31, the speed controller 32 and the position speed estimator 33.

Basically, in the armature movement control, the armature 6a may be smoothly moved by the sensor-less vector control than the open-loop control according to the present embodiment. However, when the moving speed of the armature 6a becomes low (slow speed), the controlling of the sensor-less vector control method does not become effective. That is, the estimation of the position and speed by the sensor-less vector control are performed, for example, by obtaining an induced electromotive force generated to the armature 6a in response to the moving speed of the armature 6a based on the voltage to be applied to the armature 6a and feedback current thereto. However, if the armature stops or the moving speed is too slow, it is impossible to detect the induced electromotive force. At such time, the magnetic field generated from the armature 6a is not moved in synchronous with the movement of the armature 6a.

Accordingly, the control-mode switch unit 41 performs the switching of the control mode at a preliminarily set speed α. This speed α is a speed preliminarily set within a speed range capable of moving the armature 6a in synchronous with the movement of the magnetic field generated by the armature 6a by the sensor-less vector control, and is set on the basis of a test, simulation or the like. In a case where it is required to increase control area by the sensor-less vector control, the speed α will be set to be low within a range in which the movement of the armature can be controlled.

Figure 6:
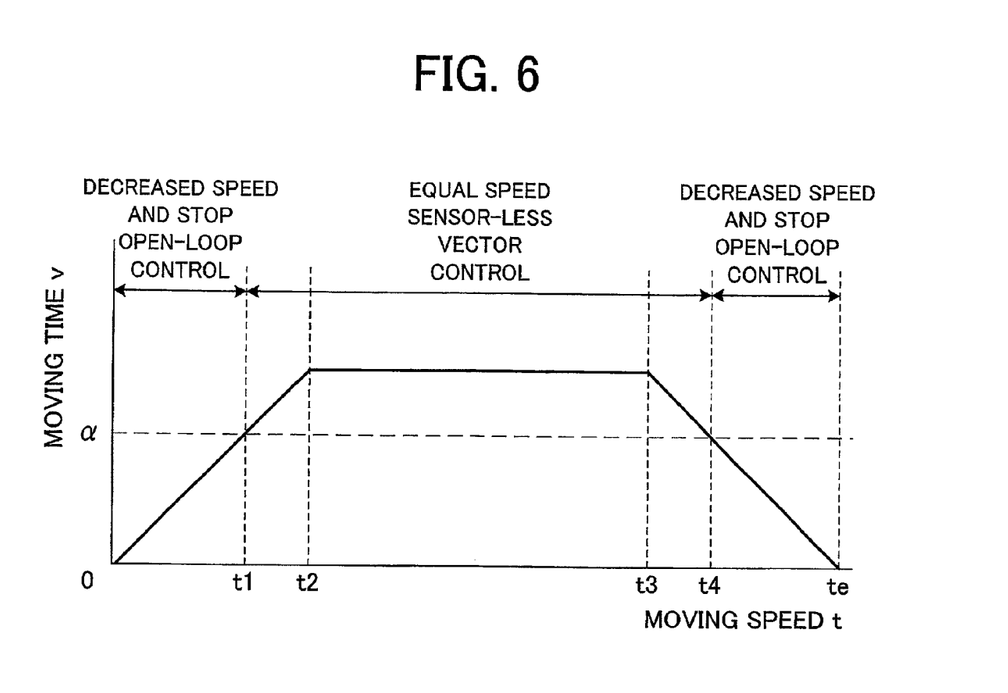
FIG. 6 shows a graph representing a relationship between a moving time and a moving speed in a case where an armature 6a is moved from one and to the other end of a magnet plate 6b in a longitudinal direction thereof.

FIG. 6 is a graph representing relationship between a moving time and a moving speed at a time when the armature 6a is moved from one end to the other end in the longitudinal direction of the magnet plate 6b, and in this graph, a horizontal axis denotes the moving time and the vertical axis denotes the moving speed.

As shown in FIG. 6, the armature 6a starts to move from the stopped state at which the moving time is zero (moving period=0), is accelerated to the time t2, and moves at equal speed between the time t2 to t3. Thereafter, the armature 6a is decreased in the moving speed and stops at the time te. Herein, in the time interval from the moving starting time of the armature 6a to the time at which the moving speed reaches the speed α, the open-loop control is performed. Then, in the time interval from the moving time t1 to t2 and t2 to t3, the sensor-less vector control is performed. Next, in the time interval from the time t3 to the time t4 at which the moving speed is decreased to the speed α, the sensor-less vector control is successively performed, and in the time interval from the time t4 to the time te, the open-loop control is performed.

That is, the control-mode switch unit 41 outputs the sensor-less vector control command in the case where the moving speed of the armature is faster (more) than the speed α, and on the other hand, in the case where the moving speed of the armature is slower (less) than the speed α, the control-mode switch unit 41 outputs the open-loop control command.

Herein, in the case where the moving speed of the armature 6a is faster than the speed α, the position and the moving speed of the armature 6a can be estimated by the position speed estimator 33, so that it is determined which control-mode should be performed in accordance with the estimated position ω^rm, which is equivalent to the moving speed of the armature 6a.

On the other hand, in the case where the moving speed of the armature is slower the speed α, there may cause a case where the position and the moving speed of the armature 6a cannot precisely estimated by the position speed estimator 33, so that the control-mode switch unit 41 calculates the moving speed of the armature 6a in response to the position command θ*rm from the superior control unit. In the open-loop control according to the present embodiment, the electric angle θ*re corresponding to the position command θ*rm, and based on that the electric angle θ*re is continuously changed in accordance with the position command θ*rm, the armature 6a is moved in synchronous with the change of the electric angle θ*re, thus, calculating the moving speed of the armature 6a from the position command θ*rm.

Further, as a method of recognizing the initial position of the armature 6a to the driver 3, there may be provided a method utilizing a magnetic pole sensor. Otherwise, it may be possible, without using the magnetic pole sensor, to recognize the initial position of the armature by forcibly moving the armature 6a to a set position. This method will be performed, for example, by supplying a direct current to the armature 6a with a predetermined electric angle with reference to the center of the U-phase coil of the armature 6a as a standard. At this operation, the electric angle can be optionally set. The armature 6a is energized by the direct current, and the magnetic pole (S-pole) appears on the surface opposing to the magnet plate 6b positioned apart by the afore-mentioned electric angle from the center of the U-phase coil. The armature 6a is moved by the attracting force between this S-pole and the N-pole of the magnet plate 6b, and when the position of the S-pole appearing on the armature 6a accords with the position of the N-pole of the magnet plate 6b, the movement of the armature 6a stops. Thus, the armature 6a can be moved to the original initial position to the set position. At this time, since the amount of the phase shifting between the armature 6a and the magnetic pole of the magnet plate is ±180 degrees in maximum, the armature 6a moves by a distance corresponding to half of a magnetic pole pitch of the magnet plate 6b in maximum.

[1.4 Operation of Driver]

Next, operation of the driver 3 according to the present embodiment will be explained with reference to FIG. 7 being a flowchart representing a processing example of the control-mode switch unit 41 of the driver 3 according to the first embodiment.

Figure 7:
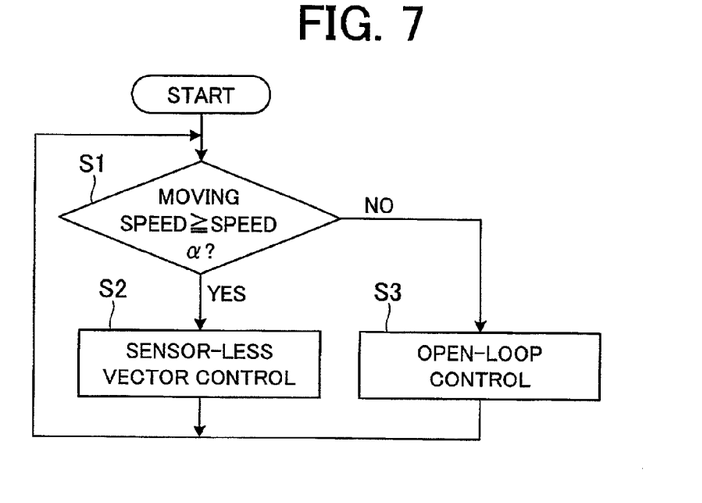
FIG. 7 is a flowchart representing an example of processing of a control switch 41 of the driver 3 according to the first embodiment.

As shown in FIG. 7, the control-mode switch unit 41 serves to judge whether the moving speed of the armature 6a is more or less than the speed α (step S1). In this step S1, in the case when the moving speed is more than the speed α ("YES" in step S1), the control-mode switch unit 41 determines to execute the sensor-less control (step S2) and the step returns to the step S1.

At this time, the control-mode switch 41 outputs the sensor-less vector control command to the position controller 31, the speed controller 32 and the position speed estimator 33. Then, the position speed estimator 33 operates the estimated position θ^rm and the estimated speed ω^rm, and the estimated position θ^rm is output to the position controller 31 and the phase detector 36, and the estimated speed ω^rm is output to the control-mode switch unit 41 and the speed controller 32.

The position controller 31 outputs the position command ω*rm in accordance with the estimated position θ^rm and the estimated speed ω^rm, in one hand, and in the other hand, the output of the position command θ*m to the phase detector 36 is stopped. The speed controller 32 operates the q-axis current command i*qa in response to the speed command ω*rm and estimated speed ω^rm. The speed controller 32 also sets the d-axis current command i*qa to zero "0".

The phase controller 36 operates the electric angle θ*re corresponding to the estimated position θ^rm. As mentioned above, the driver 3 performs the sensor-less vector control.

On the other hand, the control-mode switch unit 41 determines to perform the open-loop control (step S3) in the case where the moving speed is less than the speed α ("NO" in step S1), and the step is transferred to the step S1.

Here, the control-mode switch unit 41 outputs the open-loop control command to the position controller 31 and the position speed estimator 33. Then, the position speed estimator 33 stops its operation. The position controller 31 outputs the position command θ*rm to the phase detector 36 and also stops the operation of the speed command ω*rm. The speed controller 32 sets the q-axis current command i*qa to zero "0" and also sets the d-axis current command i*da to the rated current. The phase detector 36 calculates the electric angle θ*re corresponding to the position command θ*rm. As mentioned above, the driver 3 performs the open-loop control as described in the above sections 1 and 2. Thus, the control-mode switch unit 41 repeats the control loop.

As mentioned above, according to the present embodiment, in the case when the moving speed of the armature 6a is more than the speed α, the control-mode switch unit 41 controls the respective elements or members so as to perform the sensor-less control, and on the other hand, in the case where the moving speed of the armature 6a is less than the speed α, the control-mode switch unit 41 controls the operation such that the phase detector 36 generates the d-axis electric angle in response to the position command, the q-axis armature current controller 34 and the d-axis armature current controller 35 control the respective elements or members so as to flow the current to the d-axis armature and so as not to flow the current to the q-axis armature, so that in the equivalent speed area more than the speed α of the moving speed of the armature 6a, the moving speed of the armature 6a can be controlled to be smooth by the sensor-less vector control mode, and moreover, it is also possible to perform the controlling in the stop control mode or low speed area control mode at which the moving speed of the armature is less than the speed α. In addition, it becomes possible to perform the control mode of the armature 6a from the stop condition to the return condition.

The above controlling is made possible as follows. In the open-loop control according to the present embodiment, the N-pole of the magnet plate 6b is relatively attracted to a magnetic pole generated by the d-axis armature current corresponding to the electric angle generated by the phase detector 36 to thereby move the armature 6a. Accordingly, by controlling the rotational speed of the electric angle in response to the position command, the stop control, the low-speed area control and the return time control can be made possible, and since the stop control is performed in response to the position command, the armature 6a may be stopped to the desired position.

[2. Second Embodiment]

Hereunder, a second embodiment will be explained.

[2.1 Structure of Linear Motor System]

Figure 8:
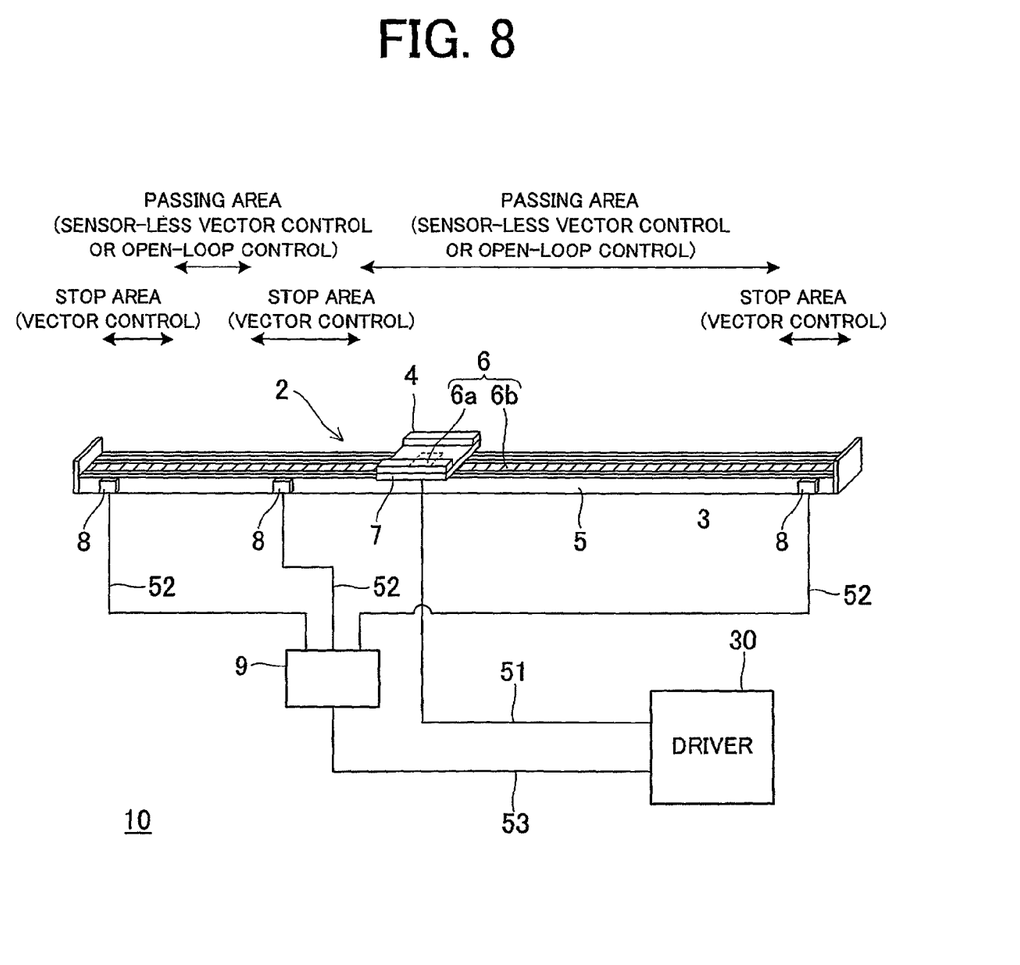
FIG. 8 is a view showing a schematic structure of a linear motor system 10 according to a second embodiment.

First, structure of a linear motor system 10 according to the second embodiment will be explained with reference to FIG. 8, which is a view showing a schematic structure of the linear motor system 10 according to the second embodiment, and in which like reference numerals are added to elements or units corresponding to those shown in FIG. 1.

As shown in FIG. 10, the linear motor system 10 includes an actuator 2, a position information switch unit 9, and a driver 30 as a control device. The actuator 2 includes a slider 4, a support base 5 supporting the slider 4 to be slidable, a linear scale 7 mounted to the slider 4, and a plurality of position sensors 8 reading the linear scale 7 and detecting the position of slider 4 (i.e., armature mounted to the slider 4).

Herein, the linear motor system 10 of the second embodiment differs from the first embodiment in a point that the linear scale 7, the position sensors 8 and the position information switch unit 9 are additionally arranged. The linear scale 7 is mounted to a side surface of the slider 4, and slits and magnetic poles are arranged along the longitudinal direction of the base 5 at an equal interval from each other.

Each of the position sensors 8 optically or magnetically reads out the linear scale 7 and outputs position information representing the position of the armature 6a to the position information switch unit 9 through an encoder cable 52. In this second embodiment, the position sensors 8 are arranged so as to read out the linear scale 7 only in an area (called "stop area" hereinlater) for determining the position to-and-fro the stop position including the stopping position preliminarily planed in an area in which the slider can be moved. In the example shown in FIG. 8, the position sensors 8 are disposed at both end portions of the slider movable range, and in addition, one position sensor 8 is also mounted to a position near the central position thereof. That is, the actuator 2 is provided with three stop areas.

An area other than the stop area is mere an area through which the slider 4 basically passes (called "passing area" hereinlater). However, even in the passing area, the slider 4 may be stopped as occasion demands. Further, in the stop area provided near the central portion, the slider 4 may stop or pass in accordance with the moving mode of the slider 4.

In the first embodiment, the current to be supplied to the armature 6a is controlled by the sensor-less vector control or open-loop control, but in the second embodiment, when the slider 4 is positioned within the stop area, the vector control is performed in accordance with the position information from the position sensor 8. When the slider 4 is positioned in the passing area, the sensor-less vector control or open-loop control is performed.

The position information switch unit 9 outputs the position information output from the position sensor 8 disposed in the stop area to the driver 30 through the encoder cable 53 by the control signal output from the driver 30.

[2.2 Structure of Driver]

Next, the driver 30 according to the present embodiment will be described hereunder. Herein, FIG. 9 is a block diagram showing one example of a schematic structure of the driver 30 according to the second embodiment, in which like reference numerals are added to elements or units corresponding to those shown in FIG. 5.

Figure 9:
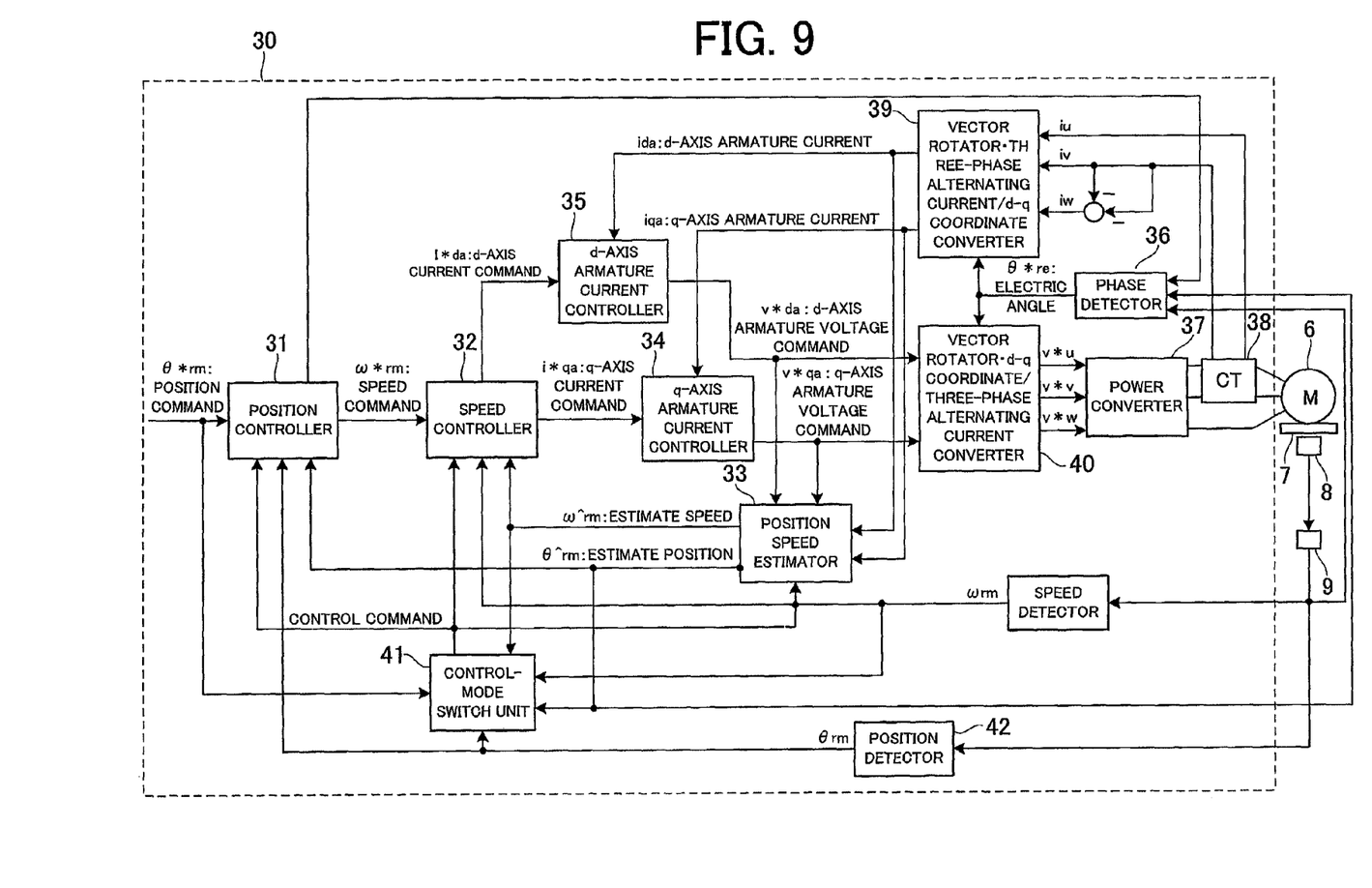
FIG. 9 is one example of a schematic structure of the driver 30 according to the second embodiment.

As shown in FIG. 9, the driver 30 includes: a position controller 31; a speed controller 32; a position speed estimator 33; a q-axis armature current controller 34 and a d-axis armature current controller 35 each as current control means; a phase detector 36 as phase generation means; a vector rotator·three-phase alternating current/d-q coordinate converter 39 as a three-phase alternating current/d-q coordinate conversion means; a vector rotator·d-q coordinate/three-phase alternating current converter 40; a control-mode switch unit 41 as selection means for selectively switching the sensor-less vector control, the open-loop control and the vector control; a position detector 42; and a speed detector 43.

the driver 30 includes: a position controller 31; a speed controller 32; a position speed estimator 33; a q-axis armature current controller 34 and a d-axis armature current controller 35 each as current controlling means; a phase detector 36 as phase generating means; a power converter 37, a current detector 38 as current detecting means, a vector rotator·three-phase alternating current/d-q coordinate converter 39 as a three-phase alternating current/d-q coordinate converting means; a vector rotator·d-q coordinate/three-phase alternating current converter 40; a control-mode switch unit 41 as a selecting means for selectively switching the sensor-less vector control, the open-loop control and the vector control; a position detector 42; and a speed detector 43.

In the above structure, the position controller 31, the speed controller 32, the q-axis armature current controller 34, the d-axis armature current controller 35, the phase detector 36, the power converter 37, the current detector 38, the vector rotator·three-phase alternating current/d-q coordinate converter 39, the vector rotator·d-q coordinate/three-phase alternating current converter 40, the position detector 42 and the speed detector 43 constitute feedback controlling means.

The second embodiment differs from the first embodiment in that the position detector 42 and the speed detector 43 are additionally provided. The position information output from the position information switch 9 is input into the position detector 42 and the speed detector 43, as well as the phase detector 36. The position detector 42 calculates a position feedback value θrm representing a position of the armature 6a on the basis of the position information, and this position feedback value θrm is then output to the position controller 31 and the control-mode switch unit 41. The position detector 42 also calculates a speed feedback value ωrm representing the moving speed of the armature 6a on the basis of the position information, and this speed feedback value ωrm is output to the speed controller 32 and the control-mode switch unit 41.

When the vector control command is supplied as the control command from the control-mode switch unit 41, the position controller 31 calculates a speed command ω*rm based on deviation between the position command θ*rm output from a superior control device and the position feedback value θrm output from the speed detector 43, and the thus calculated speed command ω*rm is output to the speed controller 32.

When the vector control command is supplied as the control command from the control-mode switch unit 41, the speed controller 32 calculates a thrust command based on a deviation between the speed command ω*rm output from a position controller 31 and the speed feedback value ωrm output from the position detector 42, and also calculates a q-axis current command i*qa.

The control-mode switch unit 41 serves to determine which one of the sensor-less vector control, the open-loop control and the vector control is to be performed on the basis of the present position and moving speed of the armature 6a of the linear synchronous motor 6, and as a result, the control-mode switch unit 41 outputs the control command to the position controller 31, the speed controller 32 and the position speed estimator 33, respectively. This control command may include the sensor-less vector control command, the open-loop control command and the vector control command.

In the present embodiment, in the case when the armature 6a is positioned in the stop area, the vector control is performed, and accordingly, in such case, stop area coordinate data representing the relationship between the stop area range and the position of the armature 6a (for example, coordinate x1-x2 is in the first stop area and coordinate x3-x4 is in the second stop area, and so on) is stored in a memory, not shown.

The control-mode switch unit 41 judges whether the armature 6a is positioned in the stop area or not by comparing the present position with the stop area coordinate data. Herein, the control-mode switch unit 41 obtains the present position of the armature 6a from the estimate position θ^rm in the case of executing the sensor-less vector control, from the position command θ*rm in the case of executing the open-loop control, and from the position feedback value θrm in the case of executing the vector control. Furthermore, the control-mode switch unit 41 obtains the moving speed of the armature 6a from the speed feedback value ωrm in the case of executing the vector control.

Furthermore, in the case when it is judged that the present position of the armature 6a enters in any one of the stop areas based on the stop area coordinate data, the control-mode switch unit 41 controls the position information switch 9 so as to output the position information from the position sensor 8, among the plural position sensors 8, mounted to the stop area in which the armature 6a is now positioned.

Structures and functions other than those mentioned above are substantially the same as those in the first embodiment, and the detailed explanation thereof is hence omitted herein.

[2.3 Operation of Driver]

Next, the operation of the driver 30 according to the present embodiment will be explained with reference to FIG. 10, which is a flowchart representing an example of processing of the control-mode switch unit 41 of the driver according to the second embodiment, and in FIG. 10, like reference numerals are added to elements and units corresponding to those shown in FIG. 7.

Figure 10:
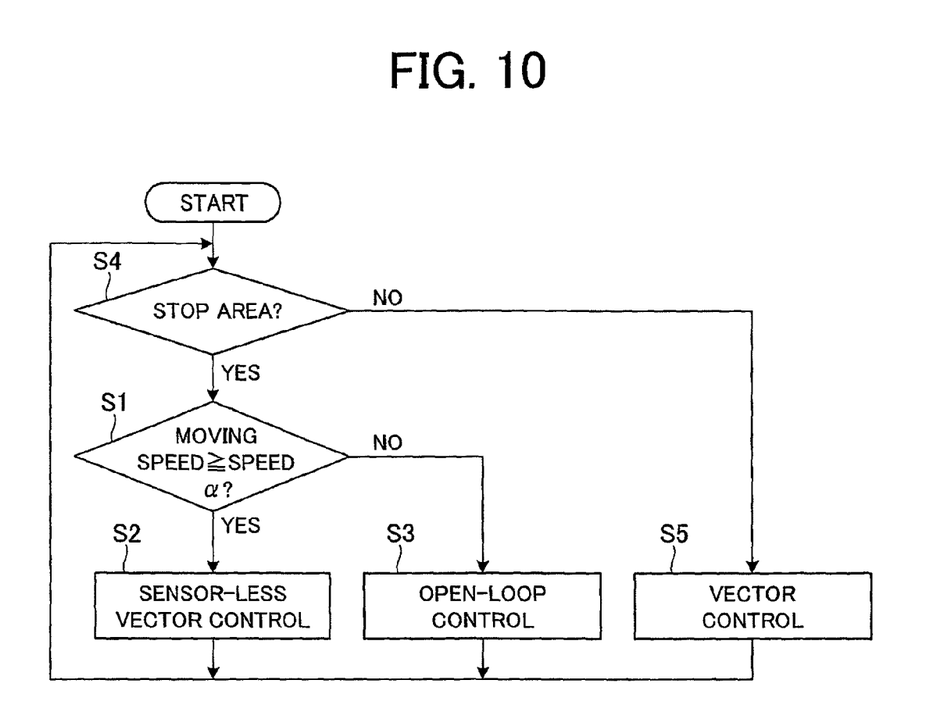
FIG. 10 is a flowchart representing an example of processing of a control switch 41 of the driver 30 according to the second embodiment.

As shown in FIG. 10, the control-mode switch unit 41 judges whether the present position of the armature 6a is in the stop area or not (step S4). At this time, in a case when the present position of the armature 6a is in the stop area ("YES" in step S4), the control-mode switch unit 41 judges to execute the vector control (step S5) and then, the step moves to the step S1.

Herein, the control-mode switch unit 41 outputs the vector control command to the position controller 31, the speed controller 32 and the position speed estimator 33, respectively. Then, the position speed estimator 33 stops the operation. The position controller 31 operates, in the one hand, so as to output the speed command ω*rm to the speed controller 32 based on the position command θ*rm and the position feedback value θrm, and on the other hand, to stop the outputting of the position command θ*rm to the phase detector 36. The speed controller 32 calculates the q-axis current command i*qa based on the speed command ω*rm and the speed feedback value ωrm. The speed controller 32 also serves to set the d-axis current command to zero "0". The position detector 36 calculates the electric angle θ*re corresponding to the position information from the position information switch 9. According to such manner, the driver 30 performs the vector control.

In the meantime, the control-mode switch unit 41 judges whether the moving speed of the armature 6a is faster than the speed α or not (step S1) in the case when the present position of the armature 6a does not enter the stop area, that is, when the armature 6a is in the passing area ("NO" in step S4). In this moment, when the moving speed of the armature is faster than the speed α ("YES" in step S1) the control-mode switch unit 41 moves to the step S1 by judging that the sensor-less vector control should be performed (step S2). During this step, the operations of the respective elements or units are substantially the same as those in the first embodiment.

On the other hand, the control-mode switch unit 41 judges that the moving speed of the armature 6a is slower than the speed α ("NO" in step S1), the control-mode switch unit 41 moves to the step S1 by judging that the open-loop control should be performed (Step S3). During this step, the operations of the respective elements or units are substantially the same as those in the first embodiment. As mentioned above, the control-mode switch unit 41 repeats the control loop.

As explained above, according to the present embodiment, in the case when the present position of the armature 6a enters the stop area, the control-mode switch unit 41 executes the vector control based on the position of the armature 6a detected by the position sensor 8 in place of the sensor-less vector control and the open-loop control, so that the stopping performance of the armature 6a in the stop area can be surely enhanced. On the other hand, in the case when the armature 6a merely passes through the passing area, the armature 6a can be smoothly moved by the sensor-less vector control, and furthermore, in the case of emergency stop of the armature 6a in the passing area, the armature 6a can be stopped to a desired position. Further, even in the case of temporary stop of the armature 6a in the passing area by the emergency stop, the operation can be got back to the position.

It is further to be noted that, in the present embodiment, although the vector control is necessarily performed in the case when the present position of the armature 6a enters the stop area, it may be possible to perform the vector control, for example, only in the case when the armature 6a stops in the stop area. In this case, if the armature 6a does not stop within the stop area, the sensor-less vector control or open-loop control will be performed, for example.

Still furthermore, in the present embodiment, although the linear scale 7 is mounted to the slider 4, the linear scales may be provided in the stop area of the base 5 and the position sensor 8 may be mounted to the slider 4. In such arrangement, only one position sensor 8 may be used, and cost required for providing of the linear scale 7 in the passing area can be saved.

Still furthermore, in the respective embodiments described above, although the armature 6a is mounted to the slider 4 and the magnet plate 6b is mounted to the base 5, the armature 6a may be mounted to the base 5 and the magnet plate 6b is on the contrarily mounted to the slider 4.

Moreover, in the respective embodiment described above, although the present invention is applied to the flat-type linear synchronous motor, it may be applied to a rod-type linear synchronous motor.

EXPLANATION OF REFERENCE NUMERAL

1, 10 - - - linear motor system, 2 - - - actuator, 3, 30 - - - driver, 4 - - - slider, 5 - - - base, 6 - - - linear synchronous motor, 6a - - - armature, 6b - - - magnet plate, 7 - - - linear scale, 8 - - - position sensor, 9 - - - position information switch, 31 - - - position controller, 32 - - - speed controller, 33 - - - position speed estimator, 34 - - - q-axis current controller, 35 - - - d-axis current controller, 36 - - - phase detector, 37 - - - power converter, 38 - - - current detector, 39 - - - vector rotator·three-phase alternating current/d-q coordinate converter, 40 - - - vector rotator·d-q coordinate/three-phase alternating current converter, 41 - - - control-mode switch unit, 42 - - - position detector, 43 - - - speed detector.

The invention claimed is:

1. A linear synchronous motor control method in which current passing through an armature of a linear synchronous motor having a movable element moved by magnetic field generated by the armature,
    wherein:
        in a case when a moving speed of the armature is faster than a predetermined speed preliminarily determined within a range in which the movable element is moved in synchronous with movement of the magnetic field generated by the armature by a predetermined sensor-less vector control, the current passing through the armature is controlled by the sensor-less vector control, and
        in a case when the moving speed of the armature is slower than the predetermined speed, in a d-q coordinate in which a d-axis represents a direction of a flux generated by field and a q-axis represents a phase advanced by π/2 with respect to the d-axis, a d-axis armature current and a q-axis armature current are controlled so that a d-axis electric angle corresponding to a position command is produced, and current passes through the d-axis armature and does not pass through the q-axis armature.

2. The linear synchronous motor control method according to claim 1, wherein in a case when the movable element is stopped during movement of the movable element in a range in which a position of the movable element is detected by a position sensor by reading a linear scale within a movable range of the movable element, the current passing through the armature is controlled based on the position of the movable element detected by the position sensor.

3. A control apparatus for controlling current passing through an armature of a linear synchronous motor in which a movable element is moved by movement of magnetic field generated by the armature, comprising:
    a sensor-less vector control unit that controls current passing through the armature by a predetermined sensor-less vector control;
    an open-loop control unit that controls current passing through the armature by an open-loop control; and
    a selecting unit that selects control unit for controlling the current passing through the armature,
    wherein the open-loop control unit comprises:
        a phase producing unit that produces a d-axis electric angle corresponding to a position command in a d-q coordinate in which a d-axis represents a direction of a flux produced by field and a q-axis represents a phase advanced by π/2 with respect to the d-axis;
        a phase producing unit that produces a d-axis electric angle corresponding to the position command;
        a current detecting unit that detects a three-phase current passing through the armature;
        a three-phase alternating current d-q coordinate converting unit that performs a coordinate conversion in which a three-phase alternating current detected by the current detecting unit is converted to a d-axis armature current and a q-axis armature current based on the electric angle produced by the phase producing unit; and a current control unit that controls the d-axis armature current and the q-axis armature current so that the current passes through the d-axis armature and does not pass through the q-axis armature, and wherein the selecting unit selects the sensor-less vector control unit in a case when the moving speed of the movable element is faster than a predetermined speed preliminarily determined within a range in which the movable element is moved in synchronous with movement of the magnetic field generated by the armature by a predetermined sensor-less vector control, and selects the open-loop control unit in a case when the moving speed of the armature is slower than the predetermined speed.

4. A control apparatus according to claim 3, further comprising a feedback control unit that controls current passing through the armature by using a feedback control based on a position detected by the position sensor detecting the position of the movable element by reading the linear scale, wherein the selecting unit selects the feedback control in a case when the movable element is stopped during the movement in a range in which the position of the movable element is detected by the position sensor within a movable range of the movable element.

* * * * *